United States Patent

Mazzarins

[15] 3,688,420
[45] Sept. 5, 1972

[54] EARTHMOVING VEHICLE HAVING TANDEM BOWLS

[72] Inventor: Janis Mazzarins, Macedonia, Ohio

[73] Assignee: General Motors Corporation, Detroit, Mich.

[22] Filed: Nov. 23, 1970

[21] Appl. No.: 91,848

[52] U.S. Cl. .................................................. 37/127
[51] Int. Cl. ........................................... E02f 3/64
[58] Field of Search ............. 37/117.5, 126, 129, 127

[56] References Cited

UNITED STATES PATENTS

| | | | |
|---|---|---|---|
| 3,584,405 | 6/1971 | Mazzarins | 37/127 |
| 3,484,964 | 12/1969 | Jeffery | 37/117.5 |
| 3,235,985 | 2/1966 | Lauster | 37/126 |
| 3,512,278 | 5/1970 | Bechman | 37/127 X |
| 3,589,041 | 6/1971 | Anderson et al | 37/127 X |
| 3,443,826 | 5/1969 | Hermiz | 37/127 X |

*Primary Examiner*—Edgar S. Burr
*Attorney*—J. L. Carpenter and E. J. Biskup

[57] ABSTRACT

An earthmoving vehicle having a front frame unit and a rear frame unit, each of which are rigidly supported by a transverse axle having wheels located on the opposite ends thereof. A pair of material-handling bowls are located in tandem between and supported by said frame units and are interconnected in a manner so that the bowls are permanently aligned along the longitudinal axis of the vehicle and each bowl can oscillate relative to the other about an axis parallel to the longitudinal axis of the vehicle.

6 Claims, 5 Drawing Figures

PATENTED SEP 5 1972

3,688,420

INVENTOR
Janis Mazzarins
BY
E.J. Bishup
ATTORNEY

EARTHMOVING VEHICLE HAVING TANDEM BOWLS

My U.S. Pat. No. 3,584,405, entitled "Scraper Having Plural Bowls," issued June 15, 1971, and assigned to the assignee of the present invention, discloses in part an earthmoving scraper having tandem bowls located between front and rear wheeled frame units. This invention is directed to an earthmoving scraper of the aforementioned type and more particularly to a unique manner of interconnecting and supporting the tandem bowls.

The objects of the present invention are to provide a vehicle having tandem material-retaining bowls located between a pair of steerable drive units and interconnected by a pivotal connection which allows the bowls to oscillate relative to each other about the longitudinal axis of the vehicle; to provide a scraper having a pair of frame units, each of which is rigidly supported by a transverse axle and serves as a sole support means for a pair of permanently aligned tandem bowls located between the frame units and interconnected in a manner so as to permit relative oscillation between the bowls about the longitudinal axis of the scraper; to provide a material-handling vehicle having a pair of interconnected load-retaining bodies that will pivot relative to each other about the vehicle's longitudinal axis only and in which the free ends of the bodies are mounted on frame units supported by rigid transverse axles; to provide a scraper having front and rear power-driven wheeled units which serve as the sole support means for a pair of aligned bowls located between the units and interconnected so that relative movement between the bowls is obtained when the scraper moves over uneven ground; and to provide a tandem bowl scraper in which the bowls are permanently maintained in longitudinal alignment but are permitted to oscillate relative to each other about the longitudinal axis of the scraper.

These and other objects and advantages of the present invention are realized by an earthmoving vehicle which comprises a front drive unit or tractor and a rear drive unit or tractor, each of which is mounted rigidly to a single transverse axle having driven wheels located at the opposite ends thereof. A pair of bowls are located between the tractors and are interconnected at all times so as to maintain longitudinal alignment of the bowls while permitting oscillation about the longitudinal axis of the vehicle. In the preferred form, each bowl has a cutting blade and each tractor is connected by a king pin to a drawbar that carries one of the bowls and allows selective raising and lowering thereof about a transverse horizontal axle so as to permit the bowl to assume a lowered-dig position and a raised-carry position. Thus, a scraping operation can be accomplished when the vehicle is driven in either direction along its longitudinal axis. In addition, each bowl is provided with an apron that can be raised to admit cut material into the bowl and closed when the material is being transported to a dumping location.

Other objects and features of the present invention will be derived from the following detailed description when taken with the drawing in which.

Figure 1:
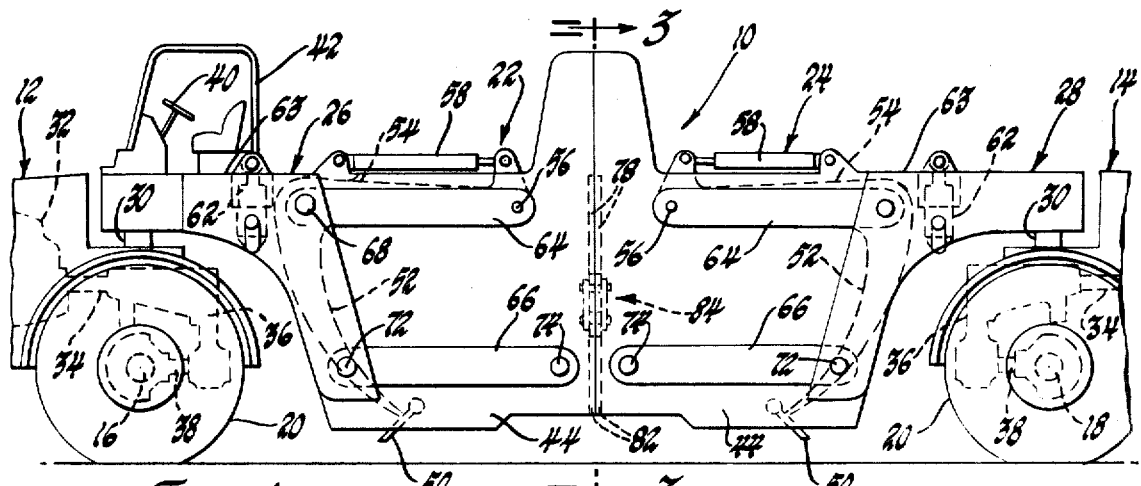
FIG. 1 is an elevational side view showing an earthmoving scraper made in accordance with the invention.
Figure 2:
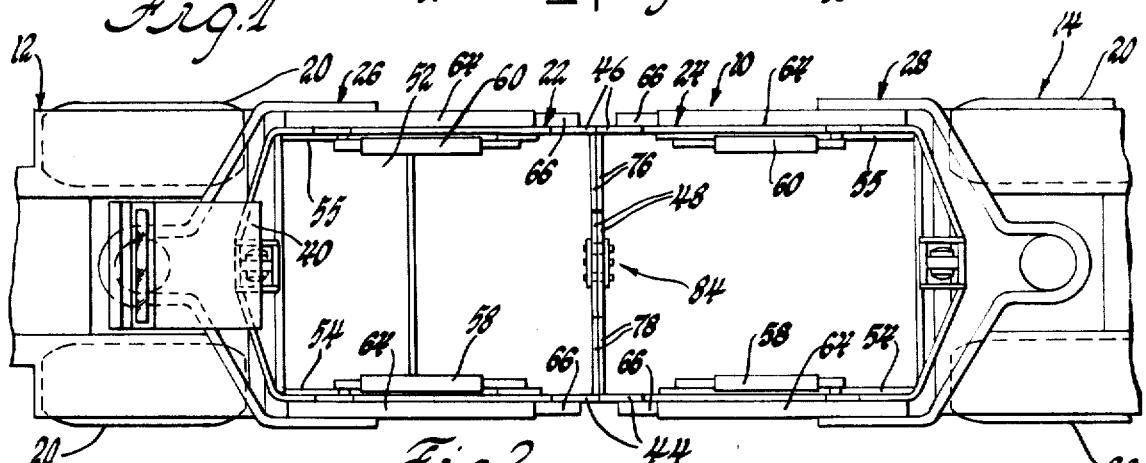
FIG. 2 is a plan view of the earthmoving scraper shown in FIG. 1.

Referring now to the drawing and more particularly FIGS. 1 and 2 thereof, an earthmoving scraper 10 made according to the invention is shown comprising a front frame or drive unit 12 and a rear frame or drive unit 14 which are respectively supported by rigid transverse axles 16 and 18, the opposite ends of which rotatably support rubber-tired wheels 20. A pair longitudinally aligned scraper bowls 22 and 24 are located between the drive units 12 and 14 and supported by draft assemblies 26 and 28, each of which is connected by a vertical king pin 30 to the associated drive unit so as to permit the latter to be steerable relative to the scraper bowls about a vertical axis.

Each of the drive units 12 and 14 includes an engine 32 connected through a suitable shaft 34 to a transmission and gear box assembly 36 which supplies drive through a drive shaft 38 to the associated axle. Accordingly, the scraper 10 has all the wheels 20 thereof driven with the engine and transmission controls as well as a steering wheel 40 being located within an operator's cab 42 mounted on the draft assembly 26.

Figure 3:
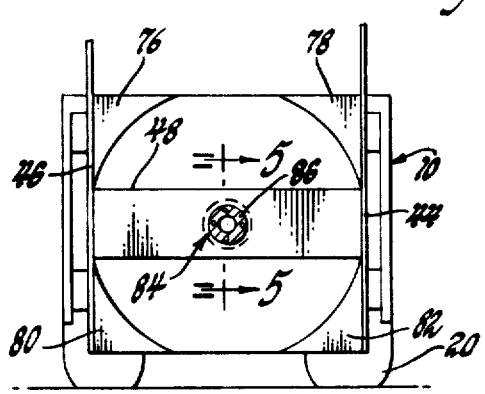
FIG. 3 is a sectional view taken on line 3—3 of FIG. 1.

The scraper bowls 22 and 24 are identically constructed and, accordingly, the same parts will be identified by the same numerals. In this regard and as seen in FIGS. 1 and 2, each scraper bowl 22 and 24 includes a pair of side walls 44 and 46 which are laterally spaced and interconnected at one end by a transversely extending cross beam 48. The opposite end of each scraper bowl carries the usual transverse cutting blade 50 located between the side walls 44 and 46 and also an apron 52 having a pair of rearwardly extending arms 54 and 55 mounted by a pivotal connection 56 to each side wall. A pair of double-acting hydraulic cylinders 58 and 60, carried by the side walls, serve to raise and lower the apron 52 in the usual fashion so as to permit material cut by the cutting blade 50 to enter the mouth of the bowl and be retained therein while the scraper 10 is driven to a dumping site where the material is discharged by an ejection system (not shown) located in the bowl. Adjacent the apron 52, each scraper bowl is supported by a vertically orientated hydraulic cylinder 62, one end of which is pivotally connected to a drawbar 63 which forms a part of each draft assembly. The other end of the hydraulic cylinder 62 is pivotally connected to the scraper bowl along the longitudinal axis of the scraper 10. The hydraulic cylinder 62 serves to raise and lower the associated end of the scraper bowl under the control of a parallelogram linkage which includes an upper control arm 64 and a lower control arm 66 connected by pivotal connections 68, 56 and 72, 74, respectively between the drawbar 63 and the side walls of the scraper bowl. In addition, it will be noted that each scraper bowl 22 and 24 is formed with generally triangular-shaped wear plates 76, 78, 80 and 82 located in the plane of the cross beam 48 and at the four corners of the scraper bowl as seen in FIG. 3. The corresponding wear plates of the scraper bowls 22 and 24 contact each other and facilitate oscillatory movement between the bowls as will be described hereinafter. Although not shown, each wear plate would be supported in the position shown by reinforcing members which would extend between the back surface of the wear plate and the associated side wall.

Figure 5:
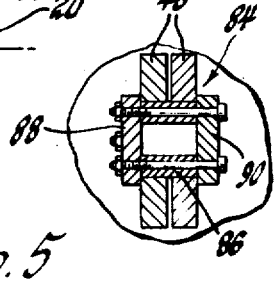
FIG. 5 is an enlarged view taken on line 5—5 of FIG. 3.
Figure 4:
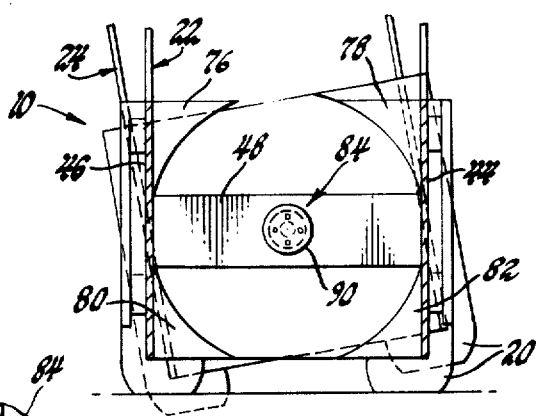
FIG. 4 is a view similar to FIG. 3 but in addition shows the relative positions that the bowls of the earthmoving scraper can assume when the latter is moving over uneven ground.

As mentioned hereinbefore, each drive unit 12 and 14 is supported by a rigid transverse axle and is connected through a king pin to a drawbar which supports one of the scraper bowls. Accordingly, it should be apparent that each axle, together with the drive unit, is movable solely about a vertical axis relative to the associated draft assembly and scraper bowl. In order to negotiate uneven terrain, however, some form of oscillation about a longitudinal axis should be permitted and, in this case, a unique arrangement is provided by having the scraper bowls 22 and 24 interconnected in a manner whereby longitudinal alignment of the bowls is maintained at all times while permitting one bowl to oscillate relative to the other about the longitudinal axis of the scraper 10. In this regard and as seen in FIGS. 1 and 2, it will be noted that the cross beams 48 of scraper bowls 22 and 24 are connected together by a pivotal connection 84 shown in detail in FIG. 5. This pivotal connection 84 includes a cylindrical bushing 86, the opposite ends of which are secured to end caps 88 and 90, each of which overlaps the cross beam 48 and serves to maintain the two scraper bowls connected together as shown in FIGS. 1 and 2. The pivotal connection 84 is located midway between the side walls 44 and 46 of the scraper bowls and in a horizontal plane which is located above the axes of wheel rotation of the drive units 12 and 14. The opposed wear plates 76, 78, 80 and 82 of the scraper bowls 22 and 24 abut each other and together with the pivotal connection 84 serve to maintain the scraper bowls in longitudinal alignment and permit controlled relative oscillation between the scraper bowls, as shown in FIG. 4, whenever the scraper 10 is traveling over uneven ground. Although not shown, suitable stop means are provided between the scraper bowls 22 and 24 so as to prevent excessive relative oscillation which could cause one of the bowls to overturn. Thus, it can be seen that the scraper 10 made in accordance with the invention has both a front drive axle and a rear drive axle which enjoy freedom of movement relative to each other not only about a vertical axis but, in addition, about a longitudinally extending horizontal axis. Moreover, the scraper 10 is a more versatile vehicle in that it allows a scraping operation to be performed when the scraper is driven in either direction along its longitudinal axis. In other words, it should be apparent that the scraper bowls 22 and 24, as joined together, can be considered a single bowl permitting material loaded into one bowl to flow into the other bowl through the opening located below and above the cross beam 48.

Various changes and modifications can be made in this construction without departing from the spirit of the invention. Such changes and modifications are contemplated by the inventor and he does not wish to be limited except by the scope of the appended claims.

I claim:

1. A material-handling vehicle including a front frame unit and a rear frame unit, each of said frame units supported by and rigidly connected to a transverse axle having wheels located on the opposite ends thereof, a power source carried by one of said frame units for driving the wheels associated therewith, a pair of material-handling bodies located in tandem between said frame units and adapted to be supported above the ground solely by said wheels, each of said material-handling bodies having one end thereof connected to one of said frame units so as to prevent relative movement about an axis parallel to the longitudinal axis of the vehicle, and means located between and interconnecting the other ends of said material-handling bodies so that the latter are permanently aligned along said longitudinal axis and each material-handling body can oscillate relative to the other solely about an axis parallel to said longitudinal axis when the vehicle traverses irregular terrain.

2. A material-handling vehicle including a front frame unit and a rear frame unit, each of said frame units supported by and rigidly connected to a transverse axle having wheels located on the opposite ends thereof, a power source carried by one of said frame units for driving the wheels associated therewith, a pair of material-handling bowls located in tandem between and supported above the ground solely by said frame units, each of said material-handling bowls having a pair of side walls interconnected at one end thereof by a transverse vertically orientated cross beam and having an opening for discharging material from the bowl, an apron carried by each bowl for opening and closing said opening, and means including a horizontal pivotal connection joining the cross beams of said bowls so that the latter are permanently aligned along the longitudinal axis of the scraper while permitting each bowl to oscillate relative to the other solely about the longitudinal axis of the vehicle when the vehicle traverses irregular terrain.

3. An earthmoving scraper comprising a pair of material-handling bowls located in tandem, each of said bowls having a pair of laterally spaced side walls interconnected by a transversely extending cross beam located at one end of each bowl, the other end of each bowl having an opening for admitting material to and discharging material from the bowl, a transverse cutting blade extending between the side walls of each bowl adjacent the open end thereof, an apron above said cutting blade for opening and closing the open end of the bowl, a pair of longitudinally spaced frame units supporting said material-handling bowls, said pair of bowls being located between said pair of frame units and the latter serving as the sole support for maintaining the bowls above the ground, each of said frame units rigidly connected to a transverse wheel-carrying axle, and means including a horizontal pivot interconnecting the cross beams of said bowls so that the latter are permanently aligned along the longitudinal axis of the scraper and each bowl and connected frame unit can oscillate together relative to the other bowl and connected frame unit about said longitudinal axis whereby said scraper can travel over irregular terrain.

4. The earthmoving scraper of claim 3 wherein said horizontal pivot interconnecting the cross beams is located midway between the side walls and in a horizontal plane located above the axes of wheel rotation of the scraper.

5. The earthmoving scraper of claim 3 wherein each frame unit supports one of said material-handling bowls by a draft assembly having power-operated means for moving said one of said material-handling bowls between a raised-carry position and a lowered-dig position.

6. An earthmoving scraper comprising a pair of material-handling bowls located in tandem, each of said bowls having a pair of laterally spaced side walls interconnected by a transversely extending cross beam located at one end of each bowl, the other end of each bowl having an opening for admitting material to and discharging material from the bowl, a transverse cutting blade extending between the side walls of each bowl adjacent the open end thereof, an apron above said cutting blade for opening and closing the open end of the bowl, a pair of longitudinally spaced frame units, each of said material-handling bowls located between said frame units and being supported by one of said frame units adjacent the apron thereof, each of said frame units rigidly connected to a transverse wheel-carrying axle, a pivotal connection located midway between the side walls and interconnecting the cross beams of said bowls so that the latter are permanently aligned along the longitudinal axis of the scraper and each bowl can oscillate relative to the other bowl about an axis parallel to said longitudinal axis whereby said scraper can travel over irregular terrain, and wear plates fixed to each bowl above and below said cross beam for facilitating oscillatory movement of said bowls relative to each other.

* * * * *